(12) United States Patent
Larsen

(10) Patent No.: US 8,741,425 B2
(45) Date of Patent: Jun. 3, 2014

(54) ALL CERAMICS SOLID OXIDE FUEL CELL

(75) Inventor: Peter Halvor Larsen, Roskilde (DK)

(73) Assignee: Technical University of Denmark, Kgs. Lyngby (DK)

( * ) Notice: Subject to any disclaimer, the term of this patent is extended or adjusted under 35 U.S.C. 154(b) by 102 days.

(21) Appl. No.: 12/922,911

(22) PCT Filed: Mar. 18, 2009

(86) PCT No.: PCT/EP2009/002010
§ 371 (c)(1),
(2), (4) Date: Dec. 8, 2010

(87) PCT Pub. No.: WO2009/115319
PCT Pub. Date: Sep. 24, 2009

(65) Prior Publication Data
US 2011/0089028 A1    Apr. 21, 2011

(30) Foreign Application Priority Data

Mar. 18, 2008    (EP) .................................. 08005045

(51) Int. Cl.
*H01M 8/10* (2006.01)
*C25B 9/00* (2006.01)
*B05D 5/12* (2006.01)

(52) U.S. Cl.
USPC ...... 428/212; 428/702; 428/701; 204/192.15; 204/252; 429/149

(58) Field of Classification Search
None
See application file for complete search history.

(56) References Cited

U.S. PATENT DOCUMENTS

| | | | |
|---|---|---|---|
| 5,273,837 A | 12/1993 | Aitken et al. | |
| 5,306,411 A * | 4/1994 | Mazanec et al. | 204/265 |
| 5,543,239 A | 8/1996 | Virkar et al. | |
| 5,693,212 A * | 12/1997 | Mazanec et al. | 205/462 |
| 5,744,015 A * | 4/1998 | Mazanec et al. | 204/295 |
| 6,017,647 A | 1/2000 | Wallin | |
| 6,019,885 A * | 2/2000 | Mazanec et al. | 205/633 |
| 6,257,718 B1 | 7/2001 | Spencer et al. | |
| 6,558,831 B1 | 5/2003 | Doshi et al. | |
| 6,632,554 B2 | 10/2003 | Doshi et al. | |
| 6,682,842 B1 | 1/2004 | Visco et al. | |
| 7,361,424 B2 * | 4/2008 | Jankowski et al. | 429/425 |

(Continued)

FOREIGN PATENT DOCUMENTS

| | | |
|---|---|---|
| CA | 2 709 211 A1 | 6/2009 |
| EP | 1 482 584 A1 | 12/2004 |

(Continued)

OTHER PUBLICATIONS

Shao et al. Nature vol. 431, 2004, 170-173.*

*Primary Examiner* — Vera Katz
(74) *Attorney, Agent, or Firm* — Seed IP Law Group PLLC

(57) ABSTRACT

The present invention provides an all ceramics solid oxide cell, comprising an anode layer, a cathode layer, and an electrolyte layer sandwiched between the anode layer and the cathode layer, wherein the electrolyte layer comprises doped zirconia and has a thickness of from 40 to 300 μm; wherein the anode layer and the cathode layer both comprise doped ceria or both comprise doped zirconia; and wherein the multilayer structure formed of the anode layer, the electrolyte layer and the cathode layer is a symmetrical structure. The present invention further provides a method of producing said solid oxide cell.

6 Claims, 1 Drawing Sheet

(56) References Cited

U.S. PATENT DOCUMENTS

| | | |
|---|---|---|
| 7,767,358 B2 * | 8/2010 | Seabaugh et al. ............ 429/483 |
| 7,871,735 B2 * | 1/2011 | Seabaugh et al. ............ 429/491 |
| 2003/0082436 A1 | 5/2003 | Hong et al. |
| 2003/0138685 A1 * | 7/2003 | Jankowski et al. ............ 429/30 |
| 2004/0018409 A1 * | 1/2004 | Hui et al. .................... 429/33 |
| 2004/0043273 A1 * | 3/2004 | Jankowksi et al. ............ 429/33 |
| 2004/0101729 A1 * | 5/2004 | Kearl ........................ 429/30 |
| 2004/0166380 A1 * | 8/2004 | Gorte et al. .................. 429/12 |
| 2006/0093884 A1 | 5/2006 | Seabaugh et al. |
| 2006/0257718 A1 | 11/2006 | Sato et al. |
| 2006/0269813 A1 | 11/2006 | Seabaugh et al. |
| 2007/0134536 A1 | 6/2007 | Takase et al. |
| 2007/0134543 A1 | 6/2007 | Huang et al. |
| 2008/0038611 A1 | 2/2008 | Sprenkle et al. |
| 2010/0062312 A1 | 3/2010 | Larsen et al. |

FOREIGN PATENT DOCUMENTS

| | | |
|---|---|---|
| EP | 1 928 049 A1 | 6/2008 |
| GB | 1000576 | 12/1961 |
| JP | 01-227362 | 9/1989 |
| JP | 05151981 A2 | 6/1993 |
| JP | 07240217 A2 | 9/1995 |
| JP | 09063603 A2 | 3/1997 |
| JP | 09245811 A2 | 9/1997 |
| WO | WO 98/49738 A1 | 11/1998 |
| WO | 2005/045969 A2 | 5/2005 |
| WO | 2005/122300 A2 | 12/2005 |
| WO | 2006/082057 A2 | 8/2006 |
| WO | WO 2006/082057 A2 | 8/2006 |
| WO | WO 2007/011894 A1 | 1/2007 |

* cited by examiner

ALL CERAMICS SOLID OXIDE FUEL CELL

TECHNICAL FIELD

The present invention relates to an all ceramics solid oxide cell (SOC) and a method for preparing same.

BACKGROUND ART

Solid oxide cells (SOCs) generally include cells designed for different applications, such as solid oxide fuel cells (SOFCs) or solid oxide electrolysis cells (SOECs). Due to their common basic structure, the same cell may, for example, be used in SOFC applications as well as SOEC applications. Since in SOFCs fuel is fed into the cell and converted into power, while in SOECs power is applied to produce fuel, these cells are often referred to as 'reversible' SOCs.

Solid oxide cells may have various designs. Typical configurations include an electrolyte layer being sandwiched between two electrodes. During operation of the cell, usually at temperatures of about 500° C. to about 1100° C., one electrode is in contact with oxygen or air, while the other electrode is in contact with a fuel gas.

The most common manufacture processes suggested in the prior art comprise the manufacture of single cells. Generally, a support is provided, on which an electrode layer is formed, followed by the application of an electrolyte layer. The so formed half cell is dried and afterwards sintered, in some cases in a reducing atmosphere. Finally, a second electrode layer is formed thereon so as to obtain a complete cell. Alternatively, one of the electrode layers or the electrolyte layer may be used as a support layer, having a thickness of about 300 μm or more.

This approach usually requires a relatively thick support layer to provide mechanical stability of the obtained cell, thereby increasing the overall thickness of the single cells. It has been suggested to form the support from metals or metal alloys, which are less brittle than ceramic materials and therefore superior in mechanical stability. However, disadvantageously it has been found that due to the metallic materials used, poisoning of the catalyst in the adjacent electrode layer due to migration from the support, especially if chromium is used in the support, may occur. Furthermore, metal supports are not suitable for SOCs intended for high temperature applications in the range up to about 1000° C.

If alternatively one of the electrodes is also used as the support layer, on the one hand the overall thickness of said layer determines the mechanical stability of the cell, i.e. the layer must be sufficiently thick; on the other hand the layer thickness influences the gas diffusion through the electrode layer and should therefore be sufficiently thin. Furthermore, in order to produce cells as cost effective as possible, the amount of materials used for each layer should be kept to a minimum.

US-A-2004/0166380 (Gorte et al) relates to porous electrodes for use in SOFCs, wherein the electrodes are comprised primarily of a ceramic material and an electrochemically conductive material. The electrodes are prepared by impregnating a porous ceramic material with precursors of the electrochemically conducting material. The focus is especially on providing a cathode comprising a porous ceramic matrix and an electrochemically conducting material dispersed at least partially within the porous ceramic matrix, wherein the porous ceramic matrix includes a plurality of pores having a pore size of at least about 0.5 μm.

US-A-2004/0018409 (Hui et al) discloses a SOFC comprising a dense electrolyte disposed between a porous anode and a porous cathode. The electrolyte may preferably be yttria stabilized zirconia. The anode may be formed from yttrium-doped strontium titanate, yttrium-doped strontium titanate and nickel, doped ceria, lanthanum-doped ceria and nickel or yttria stabilized zirconia and nickel. The cathode may be formed from strontium-doped lanthanum manganite or doped lanthanum ferrite. The SOFC may further comprise 'interlayers' disposed between the electrodes and the electrolyte. Said layers are dense layers which function as a barrier layer. The interlayers further do not comprise any catalyst material, and since the layers are dense layers, they cannot function as electrodes.

WO-A-2006/082057 (Larsen) relates to a SOFC comprising an electrolyte layer sandwiched in between two electrode layers, and further a metallic support for mechanical stability of the cell.

US-A-2004/0101729 (Kearl) relates to a SOFC with a thin film electrolyte in combination with both, a thick film anode/fuel electrode and a thick film cathode/air electrode. The cathode preferably comprises a material, such as silver, or a material having a perovskite structure, such as lanthanum strontium manganite, lanthanum strontium ferrite, lanthanum strontium cobaltite, $LaFeO_3/LaCoO_3$, $YMnO_3$, $CaMnO_3$, $YFeO_3$, and mixtures thereof. The cell may further comprise interfacial layers between the electrodes and the electrolyte layer. Said interfacial layers do not comprise any catalyst material, and since the layers are dense layers, they cannot function as electrodes.

WO-A-98/49738 (Wallin et al) discloses a composite oxygen electrode/electrolyte structure for a solid state electrochemical device having a porous composite electrode in contact with a dense electrolyte membrane, said electrode comprising:
(a) a porous structure having interpenetrating networks of an ionically-conductive material and an electronically-conductive material; and
(b) an electrocatalyst different from the electronically-conductive material, dispersed within the pores of the porous structure.

WO-A-2007/011894 (Hertz et al) discloses a thin-film composite material with nanometer-scale grains, comprising a thin-film layer that includes:
a) an electronic conductor; and
b) an ionic conductor.

US-A-2003/0082436 (Hong et al) relates to an electrode for a SOFC, sensor or solid state device, comprising an electrode coated with an oxygen ion conducting ceramic ceria film. The electrolyte may be a YSZ electrolyte sandwiched by Pt-LSM electrodes.

U.S. Pat. No. 5,543,239 (Virkar et al) discloses an improved electrode/electrolyte structure having an enhanced three-faced boundary length for use as a fuel cell, a catalyst or a sensor, wherein said structure comprises:
a) a substrate layer consisting of the dense electrolyte material;
b) a porous surface layer of said dense electrolyte material over the dense electrolyte substrate layer;
c) an electrocatalyst material on and within the porous surface layer of electrolyte, wherein the electrocatalyst material is continuous on the surface of the porous electrolyte, creating enhanced three-faced boundaries with gas present; and
d) said structure is integrally connected or attached to a porous anode.

US-A-2006/0093884 (Seabaugh et al) relates to a ceramic laminate structure including partially stabilized zirconia electrode layers, sandwiching a fully stabilized zirconia electrolyte layer.

US-A-2008/0038611 (Sprenkle et al) discloses an electrode supported electrolyte membrane for an electrochemical cell comprising:
 a substantially continuous layer of a ceramic ion conducting electrolyte supported on a conductive electrode substrate, wherein the substrate includes an active electrode layer and a bulk electrode layer;
 a backing structure on a face of the bulk electrode layer opposite the electrolyte layer with a thermal expansion coefficient approximately equal to the thermal expansion coefficient of the electrolyte layer.

EP-A-1482584 (Komada et al) teaches an electrode for a solid oxide cell wherein:
 the electrode comprises a skeleton constituted of a porous sintered compact having a three dimensional network structure, the porous sintered compact being made of an oxide ion conducting material and/or a mixed oxide ion conducting material;
 grains made of an electron conducting material and/or a mixed oxide ion conducting material are adhered onto the surface of said skeleton; and
 said grains are baked inside the voids of said porous sintered compact under the conditions such that the grains are filled inside the voids.

In view of the disadvantages of the SOC compositions of the prior art, there is still a desire for improved SOCs which are durable, have good mechanical stability, do not suffer from the above described drawbacks of the SOCs of the prior art, may be used in a wide temperature range up to 1000° C. or above, and which have an overall excellent life time.

OBJECT OF THE PRESENT INVENTION

It was therefore the objective problem underlying the present invention to provide an SOC have an enhanced electrode performance and excellent lifetime without sacrificing mechanical stability of the cell, and to provide a method of producing same.

SUMMARY

The above problem is solved by an all ceramics solid oxide cell, comprising an anode layer, a cathode layer, and an electrolyte layer sandwiched between the anode layer and the cathode layer,
 wherein the electrolyte layer comprises doped zirconia and has a thickness of from 40 to 300 μm,
 wherein the anode layer and the cathode layer both comprise doped ceria or both comprise doped zirconia; and
 wherein the multilayer structure formed of the anode layer, the electrolyte layer and the cathode layer is a symmetrical structure.

The above problem is further solved by a method of producing the above all ceramics solid oxide cell, comprising the steps of:
 providing a first electrode precursor layer;
 forming an electrolyte layer on top of the first electrode precursor layer;
 forming a second electrode precursor layer on top of the electrolyte layer; and
 sintering the obtained multilayer structure.

Preferred embodiments are set forth in the subclaims and the following detailed description of the invention.

DETAILED DESCRIPTION OF THE INVENTION

SOC of the Invention

Figure 1:
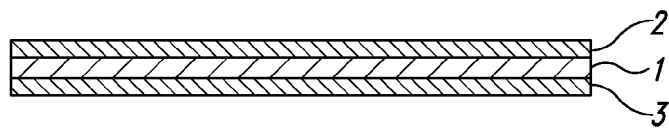
FIG. 1 illustrates a SOC in accordance with the present invention, comprising an electrolyte layer 1 sandwiched by two electrode layers 2, 3.

The invention provides an all ceramics solid oxide cell, comprising an anode layer, a cathode layer, and an electrolyte layer sandwiched between the anode layer and the cathode layer,
 wherein the electrolyte layer comprises doped zirconia and has a thickness of from 40 to 300 μm;
 wherein the anode layer and the cathode layer both comprise doped ceria or both comprise doped zirconia; and
 wherein the multilayer structure formed of the anode layer, the electrolyte layer and the cathode layer is a symmetrical structure.

The solid oxide cell of the present invention includes solid oxide fuel cells as well as solid oxide electrolysis cells. By "all ceramics" in the sense of the present invention it is referred to a SOC which does not comprise a metallic layer or a layer comprising in part metal components other than catalyst material. Thus, the cell of the present invention does not comprise any metallic support or any layers which are at least partly or completely formed from metals or metal alloys. Advantageously, poisoning of the electrode layers and the catalyst therein due to migration of species from metals is effectively avoided. Furthermore, the cell is suitable to be used under operation conditions such as temperatures up to about 1000° C. or above if desired. In particular, the "all ceramics" solid oxide cell does not comprise any metal other than catalyst material being introduced by impregnation of the electrode precursor layers after sintering. Instead, the "all ceramics" solid oxide cell only comprises non-metallic components except for catalyst material.

The SOC of the present invention specifically comprises a doped zirconia electrolyte layer which is sandwiched between two porous doped ceria electrode layers or between two porous doped zirconia electrode layers. Due to this configuration, doped zirconia as the electrolyte layer is solely an ionic conductor, whereas doped ceria in the layer forming the cathode provides a better ionic conductivity and less reactivity with the cathode materials than doped zirconia. As for the anode, doped ceria becomes a mixed conductor, i.e. conductor of both, electrons and ions, and thereby enhances the anode performance as compared to an anode based on doped zirconia. Thereby, an enhanced electrode performance is provided.

In the cell of the present invention, the multilayer structure formed of the anode layer, the electrolyte layer and the cathode layer is a symmetrical structure. "Symmetrical" in the sense of the present invention refers to the anode and cathode (precursor) layers being porous and both layers being identical in the ceria composition, and in the thickness of each electrode (precursor) layer, thus sandwiching the electrolyte layer so as to form a symmetrical structure. This ensures that the mechanical forces exerted on the electrolyte layer during the temperature cycling in use from both sides are symmetrical. Furthermore, since the thermal expansion of the electrode layers is larger than the thermal expansion of the electrolyte layer sandwiched in between, the electrolyte layer is under compression during cooling of the cell. Both advantageously result in an improved mechanical strength of the cell. If electrodes comprising doped zirconia are used, the thermal expansion coefficient (TEC) of the layers is preferably adjusted by the concentration of the dopant or by employing a suitable dopant to ensure that the TEC of the electrodes is higher than the TEC of the electrolyte layer.

Of course, the final cathode and anode layer differentiate in the catalyst used, which however has no influence on the symmetrical character of the cell, as is immediately evident to a person skilled in the art. More specifically, the presence of a different catalyst does not have any influence on the layer thickness, porosity or ceria composition of each layer.

When referring to the "electrode precursor layers" in the sense of the present invention, it is referred to the electrode layers during the manufacture of the cell after sintering but prior to the impregnation with a catalyst material, as will be described below in connection with the method of the present invention. Prior to the impregnation with catalyst material, which is a preferred embodiment, the electrode layers are identical in the ceria or zirconia composition, and in the thickness, as described above. They are formed into the final electrode layers, i.e. the cathode layer and the anode layer, by selecting the respective catalyst materials and impregnating the layers therewith, which define the function of the electrode layer.

Thus, "Symmetrical" in the sense of the present invention refers to the cell comprising an anode layer and cathode layer which are identical in the ceria or zirconia composition, and in the thickness, and only differ in terms of the catalyst.

Figure 2:
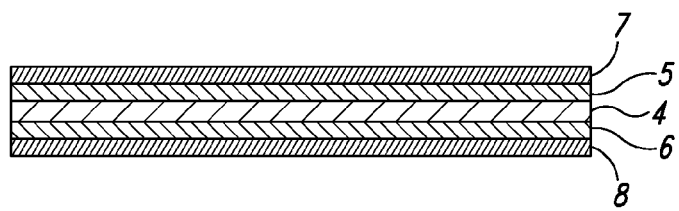
FIG. 2 illustrates a SOC in accordance with the present invention, comprising an electrolyte layer 4 sandwiched by electrode layers 5 to 8.

As may be seen from FIG. 1, the electrode layers may be formed as single layers 2 and 3. However, as may be seen from FIG. 2, the electrode layers, i.e. the anode layer and the cathode layer, may also be formed as a multilayer structure comprising the same number of layers on each side. As shown in FIG. 2, each electrode comprises two layers 5, 7 and 6, 8. Each electrode may of course have more than two layers if desired without compromising the symmetry of the multilayer structure as described above.

Electrolyte Layer

The thickness of the electrolyte layer comprising doped zirconia is from 40 to 300 μm, preferably from 50 to 280 μm in the dry state. It is more preferred that the thickness is up to 200, even more preferred up to 250 μm, and even more preferably up to 150 μm. The thickness depends on the intended operational temperature and the requirements of ionic conductivity and mechanical strength of the later application of the cell. Contrary to SOCs of the prior art, wherein the electrolyte layers should be as thin as possible, the electrolyte layer of the SOC of the present invention may be comparatively thick, i.e. up to 300 μm, thus allowing for thinner electrode layers without compromising the mechanical stability.

Figure 3:
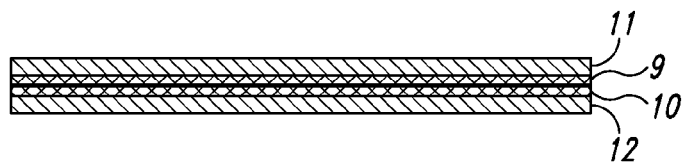
FIG. 3 illustrates another embodiment of an SOC in accordance with the present invention, comprising two electrolyte layers 9, 10 and two electrode layers 11 and 12.

In another preferred embodiment, the electrolyte layer of the thin reversible solid oxide fuel cell is a multilayer structure comprising at least two layers, as illustrated by layers 9 and 10 in FIG. 3. The overall thickness of said multilayer structure is still in the above range.

Electrode Layers

The thickness of the electrode layers, i.e. the anode layer and the cathode layer, comprising doped ceria is preferably 150 μm or less in the dry state, more preferably 100 μm or less, and even more preferably 50 μm or less. As the electrolyte layer in some cases provides the mechanical stability, the electrode layers may be relatively thin. Furthermore, the electrode layers are preferably at least 1 μm thick, more preferably 10 μm, and most preferably 20 μm. As the cell has a symmetrical character, the thickness of the anode layer and the cathode layer is of course identical, as defined above.

The electrode precursor layers prior to impregnation with a catalyst preferably have a porosity of from 20 to 80%, more preferably from 30 to 70%, and even more preferably from 40 to 60% as determined by mercury porosimetry.

In a more preferred embodiment, the electrode precursor layers comprise two different layers each, as shown in FIG. 2. The electrode precursor layers may comprise more than two layers each, while maintaining an overall symmetrical cell structure.

Since the final cell structure is a symmetrical structure, with the electrolyte layer being sandwiched by the electrode layers as described above, the electrolyte layer having a smaller TEC than the electrode layers in contact with the electrolyte layer will be under compression during cooling. Consequently, the cell exhibits an improved stability, resulting in a longer cell life.

Figure 4:
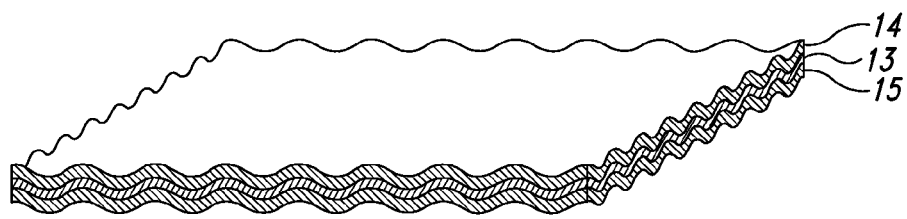
FIG. 4 illustrates an SOC in accordance with the present invention, having a corrugated pattern, comprising an electrolyte layer 13 sandwiched by two electrode layers 14, 15.

In a further preferred embodiment, the manufactured cell structure is profiled prior to sintering so as to obtain a patterned structure. Patterned structures include a ribbon structure or egg tray structure, as illustrated by FIG. 4. The pattern may be used to provide gas channels in the cell during later use if desired. If present, said pattern contributes to the overall stiffness and handling strength of the cell. The profiling of the cell further increases the power/volume performance of the stack which is highly advantageous in certain applications. How to profile a cell structure is well known to a person skilled in the art.

When a catalyst is present in the electrode layers, preferably the catalyst or precursor thereof for the impregnation of the electrode precursor layer which will function as the cathode layer is selected from the group consisting of manganites, ferrites, cobaltites and nickelates or mixtures thereof. $(La_{1-x}Sr_x)_sMnO_{3-\delta}$ and $(A_{1-x}B_x)_sFe_{1-y}Co_yO_{3-\delta}$ where A=La, Gd, Y, Sm, Ln or mixtures thereof, and B=Ba, Sr, Ca, or mixtures thereof, and Ln=lanthanides. Examples include lanthanum strontium manganate, lanthanide strontium iron cobalt oxide, $(La_{1-x}Sr_x)MnO_{3-\delta}$, $(Ln_{1-x}Sr_x)MnO_{3-\delta}$, $(La_{1-x}Sr_x)Fe_{1-y}Co_yO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, or mixtures thereof. In the formula, x is from about 0 to 1, more preferably from about 0.1 to 0.5, and most preferably from 0.2 to 0.4. Y is from about 0 to 1, more preferably from about 0.1 to 0.5, and most preferably from 0.2 to 0.3. S is preferably from 0.7 to 1.

Furthermore, electrolyte materials such as doped zirconia or doped ceria may be impregnated into the electrode precursor layer designated as the cathode if desired, alone or in combination with any of the materials mentioned above.

When a catalyst is present in the electrode layers, it is also preferred that the catalyst or precursor thereof for the impregnation of the electrode precursor layer which will function as the anode layer is selected from the group consisting of Ni, $Fe_xNi_{1-x}$ alloys and a mixture of Ni and doped ceria/zirconia or a mixture of Cu and Cu and doped zirconia/ceria. Alternatively $Ma_xTi_{1-x}Mb_xO_{3-\delta}$, Ma=Ba, Sr, Ca; Mb=V, Nb, Ta, Mo, W, Th, U; $0 \leq s \leq 0.5$; or $LnCr_{1-x}M_xO_{3-\delta}$, M=T, V, Mn, Nb, Mo, W, Th, U may be used. In the formula, x is from about 0 to 1, more preferably from about 0.1 to 0.5, and most preferably from 0.2 to 0.3.

Moreover, electrocatalytic active electrolyte materials such as doped ceria may be impregnated into the anode if desired, alone or in combination with any of the materials mentioned above.

Optional Barrier Layer

In another preferred embodiment, the electrode precursor layer designated as the cathode is impregnated with barrier material. By providing a barrier material that is deposited on the surfaces in the electrode precursor layer and electrolyte layer by impregnation through the cathode precursor layer, interface reactions between cathode materials and the electrolyte material at elevated temperatures, for example during the operation of the cell, is effectively prevented. This eliminates undesired reactions between cathode and electrolyte materials, particularly between La and/or Sr oxides in the cathode layer, and $ZrO_2$ in the electrode precursor layer and electrolyte layer, which otherwise would result in the formation of electrically insulating interface layers in the cell and thereby reduce its electrochemical activity.

Preferably, the barrier material comprises ceria, more preferably doped ceria such as $(Ce_{0.9}Gd_{0.1})O_{2-\delta}$ (i.e. CGO10) or $(Ce_{0.9}Sm_{0.1})O_{2-\delta}$ (i.e. CSO10).

The precursor solution or suspension of the barrier material is preferably a nitrate solution of doped ceria, for instance a nitrate solution of Gd doped ceria $((Ce_{0.9}Gd_{0.1})O_{2-\delta})$, or a colloidal suspension of doped ceria particles having average diameter of 2 to 100 nm, preferably 30 to 100 nm, more preferably 30 to 80 nm.

METHOD OF THE INVENTION

The present invention further provides a method of producing the above described all ceramics solid oxide cell, comprising the steps of:

providing a first electrode precursor layer;
forming an electrolyte layer on top of the first electrode precursor layer;
forming a second electrode precursor layer on top of the electrolyte layer; and
sintering the obtained multilayer structure.

The cell may be manufactured using standard ceramic processing techniques as well as advanced colloidal and chemical processing as proposed as known to a person skilled in the art. Preferably, the sintering temperature is in the range of 1000 to 1300° C.

Preferably, the method further comprises the step of impregnation of the electrode precursor layers with the above mentioned electrochemically active materials.

Optional Barrier Layer

In another preferred embodiment, the cathode precursor layer is impregnated with a barrier material prior to impregnation with a catalyst material. As indicated above, by providing a barrier material that is deposited on the surfaces in the electrode precursor layer and electrolyte layer by impregnation through the cathode precursor layer, interface reactions between air electrode (cathode) materials and the electrolyte material are prevented. This advantageously eliminates undesired reactions between cathode and electrolyte materials, particularly between La and/or Sr oxides in the cathode and $ZrO_2$ in the electrolyte, which tend to react and form electrically insulating interface layers in the cell and thereby reduce its electrochemical activity.

Preferably, the barrier material comprises ceria, more preferably doped ceria such as $(Ce_{0.9}Gd_{0.1})O_{2-\delta}$ (i.e. CGO10) or $(Ce_{0.9}Sm_{0.1})O_{2-\delta}$ (i.e. CSO10).

Even more preferred is the step of impregnating a precursor solution or suspension of a barrier material at least into the cathode precursor layer and subsequently conducting a heat treatment. Afterwards, the electrodes are impregnated with the catalyst or catalyst precursor as mentioned above.

Advantages

The all ceramics solid oxide cell of the present invention comprises a combination of a zirconia based electrolyte and ceria or zirconia based electrode (precursor) layers which results in:

Enhanced electrode performance due to the substitution of zirconia in electrodes with ceria;
The cell being suitable for use in a wide temperature range of applications, i.e. from 500-1100° C.;
Durable all ceramics cells without the requirement of an additional support layer, especially a metal support layer;
The cell manufacturing process only requires one sintering step, making the production more cost effective;
The electrodes are impregnated after sintering of the cell, thus ensuring fine microstructures and in return a high performance;
The zirconia based electrolyte is under compressional forces from both sides due to the higher thermal expansion coefficient of ceria compared to zirconia, or due to the higher thermal expansion coefficient of the doped zirconia electrode layers compared to the zirconia electrolyte layer, and will consequently increase the mechanical strength of the cell;
The cells have an improved lifetime.

The present invention will now be described by the following examples. The invention is however intended to be not limited thereto.

EXAMPLES

Example 1

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises $Ce_{0.9}Gd_{0.1}O_2$ (CGO10) powder mixed with 10 vol % of graphite pore former. The green thickness is about 40 μm. The sintered porosity of the layer is about 50% with an average pore size around 2-3 μm.

Layer 2: The suspension is based on $Zr_{0.78}Sc_{0.2}Y_{0.02}O_{2-\delta}$ powder. The sintered thickness of the electrolyte is about 25 μm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass. The obtained structure is symmetrical, as indicated in FIG. 1.

In the third step, the laminated tapes are cut into square pieces. This is done by knife punching resulting in sintered areas in the range of 12×12 to 30×30 cm$^2$.

The fourth step comprises sintering. The laminate is heated with an increase of the temperature of about 50° C./h to about 500° C. in a flowing air atmosphere. After 2 hours of soaking, the furnace is heated to about 1200° C. with an increase of the temperature of 100° C./h, and left for 5 hours before cooling to room temperature.

The fifth step is the impregnation of the cathode. The sintered cell is masked on one side. A nitrate solution of La, Sr, Co and Fe is vacuum infiltrated into the porous structure. The infiltration is performed six times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the sixth step the anode is impregnated. The impregnated cathode side is masked prior to impregnation of the anode. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell has a thickness of about 100 µm and is ready to be built into a stack of cells. No heat treatment prior to stacking is required.

Example 2

Manufacture of a SOC

The cell is produced as outlined above for Example 1, with the exception that in step five the cathode is impregnated. The sintered cell is masked on one side. A colloidal suspension of $(La_{0.6}Sr_{0.4})_{0.97}(Co_{0.2}Fe_{0.8})O_{3-\delta}$ and $(Ce_{0.9}Gd_{0.1})O_{2-\delta}$ (CGO10) is vacuum infiltrated into the porous structure. The infiltration is performed five times with an intermediate heating step.

The obtained cell has a thickness of about 100 µm and is ready to be built into a stack of cells. No heat treatment prior to stacking is required.

Example 3

Manufacture of a SOC

The manufacturing is carried out as described in Example 1 for steps one to four.

The fifth step is the impregnation of the cathode. The sintered cell is masked on one side by a polymeric seal. A colloidal suspension of $(La_{0.75}Sr_{0.25})Mn_{1.05}O_{3-\delta}$ and (CGO10) is vacuum infiltrated into the porous structure. The infiltration is performed four times with an intermediate drying between each infiltration.

The cell is completed as described in Example 1. The obtained cell has a thickness of about 100 µm and is ready to be built into a stack of cells. No heat treatment prior to stacking is required.

Example 4

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension is based on $(Ce_{0.9}Gd_{0.1})O_{2-\delta}$ powder using charcoal as a pore-former. The green thickness is about 40 µm. The sintered porosity of the layer is about 50% with an average pore size in the range of 1-2 µm.

Layer 2: The suspension is based on $Zr_{0.78}Sc_{0.2}Y_{0.02}O_{2-\delta}$ powder. The green thickness of the foil is about 12 µm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm$^2$.

The fourth step comprises sintering. The laminate is heated with an increase of the temperature of about 50° C./h to about 500° C. in a flowing air atmosphere. After 2 hours of soaking, the furnace is heated to about 1150° C. with a temperature increase of 100° C./h and left for 5 hours before cooling to room temperature.

The fifth step is the impregnation of a cathode barrier layer. After sintering a nitrate solution of gadolinium doped ceria $(Gd_{0.1}Ce_{0.9})O_{2-\delta}$ (barrier material) is impregnated into the cathode precursor layer two times. After impregnation the sample is heat treated for 1 hour at 400° C.

The sixth step is the impregnation of the cathode. The sintered cell is masked on one side. A nitrate solution of La, Sr and Co is vacuum infiltrated into the porous structure. The infiltration is performed six times with an intermediate heating step for decomposition of the nitrates. The resulting composition of the impregnated perovskite cathode is: $(La_{0.6}Sr^{0.4})_{0.97}CoO_{3-\delta}$.

In the seventh step the anode is impregnated. The cathode impregnated side is masked. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell is about 100 µm thick and ready to be built into a stack of cells. No heat treatment prior to stacking is required.

Example 5

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises $(Ce_{0.85}Gd_{0.15})O_{2-\delta}$ (CGO15) powder mixed with 10 vol % PMMA filler. The sintered thickness is about 25 µm. The sintered porosity of the layer is about 60% with an average pore size in the range of 1-3 µm.

Layer 2: The suspension is based on $Zr_{0.78}Sc_{0.2}Y_{0.02}O_{2-\delta}$ powder. The sintered thickness of the electrolyte is about 150 µm. The sintered density of the layer is >96% of the theoretical density.

The cell is completed as described in Example 3. The so formed cell is about 200 µm thick and ready to be built into a stack of cells. No heat treatment prior to stacking is required.

Example 6

Manufacture of a SOC Having Multi Layer Electrodes

The first step comprises tape-casting of three layers; two ceria containing electrode precursor layers (layer 1 and 2) and one electrolyte layer (layer 3). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried. The relative thermal expansion coefficients (TEC) of the layers are $TEC_{layer3} < TEC_{layer1} \leq TEC_{layer2}$.

Layer 1: The suspension comprises $(Ce_{0.9}Gd_{0.1})O_{2-\delta}$. 15 vol % graphite is used as pore former. The sintered thickness is about 30 µm. The sintered porosity of the layer is about 50% with a pore size in the range of 2-5 µm.

Layer 2: The suspension is based on $(Ce_{0.9}Gd_{0.1})O_{2-\delta}$. 10 vol % graphite is used as a pore-former. The sintered thickness of the foil is about 25 µm. The sintered porosity of the layer is about 50% with a pore size in the range of 1-3 µm.

Layer 3: The suspension is based on $Zr_{0.78}Sc_{0.2}Y_{0.02}O_{2-\delta}$ powder. The sintered thickness of the foil is about 50 µm. The sintered density of the layer is >96% of the theoretical density.

The second step comprises the lamination of the above mentioned foils into a layered structure comprising an electrolyte layer (sandwiched between two electrode precursor layers on each side in the order Layer 1—Layer 2—Layer 3—Layer 2—Layer 1. This layer structure corresponds to layers 4 to 8 as shown in FIG. 2. The lamination is performed by the use of heated rolls in a double roll set-up and takes place in one pass.

In the third step, the laminated tapes are cut into square pieces. This is done by knife punching of samples with an area of about 600 cm².

The cell is completed as described in Example 1. The obtained cell is about 160 µm thick and ready to be built into a stack of cells. No heat treatment prior to stacking is required.

Example 7

Manufacture of a Thin SOC Having Multi Layer Electrolyte

The first step comprises tape-casting of three layers; one ceria containing electrode precursor layer (layer 1) and two electrolyte layers (layers 2 and 3). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried. The relative thermal expansion coefficients (TEC) of the layers are $TEC_{layer3} < TEC_{layer1} \leq TEC_{layer2}$.

Layer 1: Electrode precursor layer. The suspension is based on $(Ce_{0.9}Gd_{0.1})O_{2-\delta}$. 10 vol % graphite is used as a pore-former. The sintered thickness of the foil is about 50 µm. The sintered porosity of the layer is about 50% with a pore size in the range of 1-3 µm.

Layer 2: Electrolyte layer. The suspension is based on $(Ce_{0.9}Gd_{0.1})O_{2-\delta}$. The sintered thickness of the foil is about 10 µm. The sintered porosity of the layer is about 96%.

Layer 3: The suspension is based on $Zr_{0.78}Sc_{0.2}Y_{0.02}O_{2-\delta}$ powder. The sintered thickness of the foil is about 5 µm. The sintered density of the layer is >96% of the theoretical density.

The second step comprises the lamination of the above mentioned foils into a layered structure comprising an electrolyte layer (sandwiched between electrode precursor layers on each side in the order Layer 1—Layer 2—Layer 3—Layer 2—Layer 1. The lamination is performed by warm pressing at 120° C.

In the third step, the laminated tapes are cut into square pieces. This is done by knife punching of samples with an area of about 600 cm².

The fourth step comprises sintering. The laminate is heated at an increase of the temperature of about 50° C./h to about 500° C. in a flowing air atmosphere. After 2 hours of soaking, the furnace is heated to about 1200° C. with a temperature increase of 100° C./h and left for 5 hours before cooling to room temperature.

The fifth step is the impregnation of the cathode on the side with the electrolyte layer (layer 3). The sintered cell is masked on one side. A nitrate solution of La, Sr, Co and Fe is infiltrated into the porous structure. The infiltration is performed six times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the sixth step the anode is impregnated. The cathode impregnated side is masked. A nitrate solution of Ni, Ce and Gd is infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell has a thickness of about 125 µm thick and ready to be built into a stack of cells. No heat treatment prior to stacking is required.

Example 8

Manufacture of a SOC Having a Multilayer Electrolyte

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises $Ce_{0.9}Gd_{0.1}O_2$. The sintered thickness is about 30 µm. The sintered porosity of the layer is about 30% with a pore size in the range of 1-2 µm.

Layer 2: The suspension is based on $Zr_{0.78}Sc_{0.2}Y_{0.02}O_{2-\delta}$ powder. The sintered thickness of the foil is about 15 µm. The sintered density of the layer is >96% of the theoretical density.

The second step comprises the lamination of the above mentioned foils into a layered structure comprising two electrolyte layers (9, 10) sandwiched between two electrode precursor layers (11, 12), as shown in FIG. 3. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm$^2$.

The fourth step comprises sintering. The laminate is heated at a temperature increase of about 50° C./h to about 500° C. in a flowing air atmosphere. After 2 hours of soaking, the furnace is heated to about 1200° C. with a temperature increase of 100° C./h and left for 5 hours before cooling to room temperature.

The fifth step is the impregnation of a cathode barrier layer. After sintering a nitrate solution of gadolinium doped ceria $(Gd_{0.1}Ce_{0.9})O_{2-\delta}$ (barrier material) is impregnated into the cathode precursor layer two times. After impregnation the sample is heat treated for 1 hour at 400° C.

The sixth step is the impregnation of the cathode. The sintered cell is masked on one side by a rubber seal. A nitrate solution of La, Sr, Co and Fe is infiltrated into the porous structure. The infiltration is performed five times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the seventh step the anode is impregnated. The cathode impregnated side is masked by a rubber seal. A nitrate solution of Cu, Ni, Ce and Gd is infiltrated into the porous structure. The infiltration is performed six times with an intermediate heating schedule between each infiltration for decomposition of the impregnated nitrates. The resulting composition of the impregnated anode part is 4 vol % Cu, 38 vol % Ni and 58 vol % $(Ce_{0.9}Gd_{0.1})O_{2-\delta}$ (after reduction of NiO).

The obtained cell is about 90 μm thick and ready to be built into a stack of cells. No heat treatment prior to stacking is required.

Example 9

Manufacture of a SOC with a Patterned Profiled Structure

Steps one and two are carried out as described in Example 1.

In the third step, the laminated tapes are cut into pieces. This is done by knife punching resulting in sintered areas in the range up to 40×40 cm$^2$.

In the fourth step the laminated structures are given an egg tray pattern profiled structure by pressing, electrolyte layer (13) and two electrode precursor layers (14,15), as shown in FIG. 4.

The fifth step comprises sintering. The laminate is heated at a temperature increase of about 50° C./h to about 500° C. in a flowing air atmosphere. After 2 hours of soaking, the furnace is heated to about 1200° C. with a temperature increase of 100° C./h and left for 5 hours before cooling to room temperature.

The sixth step is the impregnation of the cathode. The sintered cell is masked on one side by a rubber seal. A nitrate solution of La, Sr, Co and Fe is infiltrated into the porous structure. The infiltration is performed six times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the seventh step the anode is impregnated. The cathode impregnated side is masked by a rubber seal. A nitrate solution of Ni, Ce and Gd is infiltrated into the porous structure. The infiltration is performed seven times with an intermediate heating schedule between each infiltration for decomposition of the impregnated nitrates. The resulting composition of the impregnated anode part is 50 vol % Ni and 50 vol % $(Ce_{0.9}Gd_{0.1})O_{2-\delta}$ (after reduction of NiO).

The obtained cell is ready to be built into a stack of cells. No heat treatment prior to stacking is required.

Example 10

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises pre-calcined $(Ce_{0.9}Gd_{0.1})O_{2-\delta}$ and 10 vol % charcoal as a pore-former. The sintered thickness is about 20 μm. The sintered porosity of the layer is about 50% with a pore size in the range of about 2 μm.

Layer 2: The suspension is based on YSZ powder. The sintered thickness of the foil is about 75 μm. The sintered density of the layer is >96% of the theoretical density.

Step two to four are carried out as described in Example 1.

The fifth step is the impregnation of the cathode. The sintered cell is masked on one side by a rubber seal. A colloidal suspension of $(La_{0.75}Sr_{0.25})Mn_{1.05}O_{3-\delta}$ and $(Ce_{0.9}Gd_{0.1})O_{2-\delta}$ (CGO10) (2:1 volume ratio) is vacuum infiltrated into the porous structure. The infiltration is performed four times with an intermediate heating step.

In the sixth step the anode is impregnated. The cathode impregnated side is masked by a rubber seal. A colloidal suspension of NiO and $Ce_{0.9}Gd_{0.1}O_2$ is vacuum infiltrated into the porous structure. The infiltration is performed five times with an intermediate drying between each infiltration. The volume ratio of NiO:CGO is 1:2.

The obtained membrane is about 100 μm thick and ready to be built into a stack of cells. No heat treatment prior to stacking is required.

Example 11

Manufacture of a SOC

The first step comprises co-casting of a three-layered structure (layer 1 and 3—electrode precursor layer, and layer 2—electrolyte layer) with intermediate drying after tape-casting of each layer. Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up as described below and the cast is subsequently dried.

Suspension 1, Layer 1 and 3: The suspension comprises pre-calcined $(Ce_{0.9}Gd_{0.1})O_{2-\delta}$ and 10 vol % charcoal as a pore-former. The sintered thickness is about 40 μm. The sintered porosity of the layer is about 50% with a pore size in the range of about 2 μm.

Suspension 2, Layer 2: The suspension is based on doped zirconia. The sintered thickness of the foil is about 100 μm. The sintered density of the layer is >96% of the theoretical density.

Layer 1 is tape-cast onto a polymeric foil. After drying, Layer 2 is tape-cast directly onto Layer 1, and after a subsequent drying Layer 3 (Suspension 1) is tape-cast directly onto the two layered structure comprising Layer 1 og Layer 2.

In the second step, the co-cast tapes are cut into square pieces. This is done by knife punching resulting in sintered areas in the range of 200-500 cm$^2$.

The third step comprises sintering. The laminate is heated at a temperature increase of about 50° C./h to about 500° C. in a flowing air atmosphere. After 2 hours of soaking, the furnace is heated to about 1150° C. with a temperature increase of 100° C./h and left for 5 hours before cooling to room temperature.

The fifth step is the impregnation of the cathode. The sintered cell is masked on one side by a rubber seal. A colloidal suspension of $(La_{0.75}Sr_{0.25})Mn_{1.05}O_{3-\delta}$ and $(Ce_{0.9}Gd_{0.1})O_{2-\delta}$ (CGO10) (2:1 volume ratio) is vacuum infiltrated into the porous structure. The infiltration is performed four times with an intermediate heating step.

In the sixth step the anode is impregnated. The cathode impregnated side is masked. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 50 vol % Ni and 50 vol % $(Ce_{0.9}Gd_{0.1})O_{2-\delta}$ (after reduction of NiO).

The obtained membrane is about 180 μm thick and ready to be built into a stack of cells. No heat treatment prior to stacking is required.

Example 12

Manufacture of a SOC

The first step comprises co-casting of a three-layered structure (layer 1 and 3—electrode precursor layer, and layer 2—electrolyte layer) without intermediate drying. Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up as described below and the cast is subsequently dried.

Suspension 1, Layer 1 and 3: The suspension comprises pre-calcined $(Ce_{0.9}Gd_{0.1})O_{2-\delta}$ and 10 vol % charcoal as a pore-former. The sintered thickness is about 50 μm. The sintered porosity of the layer is about 50% with a pore size in the range of about 2 μm.

Suspension 2, Layer 2: The suspension is based on doped zirconia. The sintered thickness of the foil is about 200 μm. The sintered density of the layer is >96% of the theoretical density.

Three doctor blade set-ups are place in series on a polymeric film and the three layers are tape-cast directly onto one another. Layer 1 (Suspension 1)—Layer 2 (Suspension 2) and Layer 3 (Suspension 1).

In the second step, the co-cast tapes are cut into square pieces. This is done by knife punching resulting in sintered areas in the range of 200-500 cm².

The third step comprises sintering. The laminate is heated at a temperature increase of about 50° C./h to about 500° C. in a flowing air atmosphere. After 2 hours of soaking, the furnace is heated to about 1150° C. with a temperature increase of 100° C./h and left for 5 hours before cooling to room temperature.

The fifth step is the impregnation of the cathode. The sintered cell is masked on one side by a rubber seal. A colloidal suspension of $(La_{0.75}Sr_{0.25})Mn_{1.05}O_{3-\delta}$ and $(Ce_{0.9}Gd_{0.1})O_{2-\delta}$ (CGO10) (2:1 volume ratio) is vacuum infiltrated into the porous structure. The infiltration is performed four times with an intermediate heating step.

In the sixth step the anode is impregnated. The cathode impregnated side is masked. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 50 vol % Ni and 50 vol % $(Ce_{0.9}Gd_{0.1})O_{2-\delta}$ (after reduction of NiO).

The obtained membrane is about 300 μm thick and ready to be built into a stack of cells. No heat treatment prior to stacking is required.

Example 13

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises $Zr_{0.88}Y_{0.12}O_{2-\delta}$ powder mixed with 10 vol % of graphite pore former. The green thickness is about 40 μm. The sintered porosity of the layer is about 50% with an average pore size around 2-3 μm.

Layer 2: The suspension is based on $Zr_{0.78}Sc_{0.2}Y_{0.02}O_{2-\delta}$ powder. The sintered thickness of the electrolyte is about 25 μm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass. The obtained structure is symmetrical, as indicated in FIG. 1.

In the third step, the laminated tapes are cut into square pieces. This is done by knife punching resulting in sintered areas in the range of 12×12 to 30×30 cm².

The fourth step is the sintering of the laminate. The laminate is heated with an increase of the temperature of about 50° C./h to about 500° C. in a flowing air atmosphere. After 2 hours of soaking, the furnace is heated to about 1200° C. with an increase of the temperature of 100° C./h, and left for 5 hours before cooling to room temperature.

In the fifth step the cathode is impregnated. The sintered cell is masked on one side. A nitrate solution of La, Sr, Co and Fe is vacuum infiltrated into the porous structure. The infiltration is performed six times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the sixth step the anode is impregnated. The impregnated cathode side is masked prior to impregnation of the anode. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell has a thickness of about 100 μm and is ready to be built into a stack of cells. No heat treatment prior to stacking is required.

Example 14

Manufacture of a SOC

The cell is produced as outlined above for Example 13, with the exception that in step five the cathode is impregnated. The sintered cell is masked on one side. A colloidal suspension of $(La_{0.6}Sr_{0.4})_{0.97}(Co_{0.2}Fe_{0.8})O_{3-\delta}$ and $(Ce_{0.9}Gd_{0.1})O_{2-\delta}$ (CGO10) is vacuum infiltrated into the porous structure. The infiltration is performed five times with an intermediate heating step.

The obtained cell has a thickness of about 100 μm and is ready to be built into a stack of cells. No heat treatment prior to stacking is required.

Example 15

Manufacture of a SOC

The manufacturing is carried out as described in Example 13 for steps one to four.

The fifth step is the impregnation of the cathode. The sintered cell is masked on one side by a polymeric seal. A colloidal suspension of $(La_{0.75}Sr_{0.25})Mn_{1.05}O_{3-\delta}$ and (CGO10) is vacuum infiltrated into the porous structure. The infiltration is performed four times with an intermediate drying between each infiltration.

The cell is completed as described in Example 13. The obtained cell has a thickness of about 100 μm and is ready to be built into a stack of cells. No heat treatment prior to stacking is required.

Example 16

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension is based on $Zr_{0.78}Sc_{0.2}Y_{0.02}O_{2-\delta}$ powder using charcoal as a pore-former. The green thickness is about 40 μm. The sintered porosity of the layer is about 50% with an average pore size in the range of 1-2 μm.

Layer 2: The suspension is based on $Zr_{0.78}Sc_{0.2}Y_{0.02}O_{2-\delta}$ powder. The green thickness of the foil is about 12 μm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm².

The fourth step the laminate is sintered. The laminate is heated with an increase of the temperature of about 50° C./h to about 500° C. in a flowing air atmosphere. After 2 hours of soaking, the furnace is heated to about 1200° C. with a temperature increase of 100° C./h and left for 5 hours before cooling to room temperature.

The fifth step is the impregnation of a cathode barrier layer. After sintering a nitrate solution of gadolinium doped ceria $(Gd_{0.1}Ce_{0.9})O_{2-\delta}$ (barrier material) is impregnated into the cathode precursor layer two times. After impregnation the sample is heat treated for 1 hour at 400° C.

The sixth step is the impregnation of the cathode. The sintered cell is masked on one side. A nitrate solution of La, Sr and Co is vacuum infiltrated into the porous structure. The infiltration is performed six times with an intermediate heating step for decomposition of the nitrates. The resulting composition of the impregnated perovskite cathode is: $(La_{0.6}Sr_{0.4})_{0.97}CoO_{3-\delta}$.

In the seventh step the anode is impregnated. The cathode impregnated side is masked. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell is about 100 μm thick and ready to be built into a stack of cells. No heat treatment prior to stacking is required.

Example 17

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises $Zr_{0.84}Y_{0.16}O_{2-\delta}$ powder mixed with 10 vol % PMMA filler. The sintered thickness is about 25 μm. The sintered porosity of the layer is about 60% with an average pore size in the range of 1-3 μm.

Layer 2: The suspension is based on $Zr_{0.80}Y_{0.20-\delta}$ powder. The sintered thickness of the electrolyte is about 150 μm. The sintered density of the layer is >96% of the theoretical density.

The cell is completed as described in Example 15. The so formed cell is about 200 μm thick and ready to be built into a stack of cells. No heat treatment prior to stacking is required.

Example 18

Manufacture of a SOC Having Multi Layer Electrodes

The first step comprises tape-casting of three layers; two zirconia containing electrode precursor layers (layer 1 and 2) and one electrolyte layer (layer 3). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried. The relative thermal expansion coefficients (TEC) of the layers are $TEC_{layer3} < TEC_{layer1} \leq TEC_{layer2}$.

Layer 1: The suspension comprises $Zr_{0.82}Y_{0.18}O_{2-\delta}$. 15 vol % graphite is used as pore former. The sintered thickness is about 30 μm. The sintered porosity of the layer is about 50% with a pore size in the range of 2-5 μm.

Layer 2: The suspension is based on $Zr_{0.84}Y_{0.16}O_{2-\delta}$. 10 vol % graphite is used as a pore-former. The sintered thickness of the foil is about 25 μm. The sintered porosity of the layer is about 50% with a pore size in the range of 1-3 μm.

Layer 3: The suspension is based on $Zr_{0.80}Y_{0.20}O_{2-\delta}$ powder. The sintered thickness of the foil is about 50 µm. The sintered density of the layer is >96% of the theoretical density.

The second step comprises the lamination of the above mentioned foils into a layered structure comprising an electrolyte layer (sandwiched between two electrode precursor layers on each side in the order Layer 1—Layer 2—Layer 3—Layer 2—Layer 1. This layer structure corresponds to layers 4 to 8 as shown in FIG. 2. The lamination is performed by the use of heated rolls in a double roll set-up and takes place in one pass.

In the third step, the laminated tapes are cut into square pieces. This is done by knife punching of samples with an area of about 600 cm².

The cell is completed as described in Example 13. The obtained cell is about 160 µm thick and ready to be built into a stack of cells. No heat treatment prior to stacking is required.

Example 19

Manufacture of a Thin SOC Having Multi Layer Electrolyte

The first step comprises tape-casting of three layers; one zirconia containing electrode precursor layer (layer 1) and two electrolyte layers (layers 2 and 3). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried. The relative thermal expansion coefficients (TEC) of the layers are $TEC_{layer3} < TEC_{layer1} \leq TEC_{layer2}$.

Layer 1: Electrode precursor layer. The suspension is based on $Zr_{0.82}Y_{0.18}O_{2-\delta}$. 10 vol % graphite is used as a pore-former. The sintered thickness of the foil is about 50 µm. The sintered porosity of the layer is about 50% with a pore size in the range of 1-3 µm.

Layer 2: Electrolyte layer. The suspension is based on $Zr_{0.84}Y_{0.16}O_{2-\delta}$. The sintered thickness of the foil is about 10 µm. The sintered porosity of the layer is about 96%.

Layer 3: Electrolyte layer. The suspension is based on $Zr_{0.80}Y_{0.20}O_{2-\delta}$ powder. The sintered thickness of the foil is about 5 µm. The sintered density of the layer is >96% of the theoretical density.

The second step comprises the lamination of the above mentioned foils into a layered structure comprising an electrolyte layer (sandwiched between electrode precursor layers on each side in the order Layer 1—Layer 2—Layer 3—Layer 2—Layer 1. The lamination is performed by warm pressing at 120° C.

In the third step, the laminated tapes are cut into square pieces. This is done by knife punching of samples with an area of about 600 cm².

The fourth step comprises sintering. The laminate is heated at an increase of the temperature of about 50° C./h to about 500° C. in a flowing air atmosphere. After 2 hours of soaking, the furnace is heated to about 1200° C. with a temperature increase of 100° C./h and left for 5 hours before cooling to room temperature.

The fifth step is the impregnation of the cathode on the side with the electrolyte layer (layer 3). The sintered cell is masked on one side. A nitrate solution of La, Sr, Co and Fe is infiltrated into the porous structure. The infiltration is performed six times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the sixth step the anode is impregnated. The cathode impregnated side is masked. A nitrate solution of Ni, Ce and Gd is infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell has a thickness of about 125 µm thick and ready to be built into a stack of cells. No heat treatment prior to stacking is required.

Example 20

Manufacture of a SOC Having a Multilayer Electrolyte

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises $Zr_{0.76}Sc_{0.2}Y_{0.03}O_{2-\delta}$. The sintered thickness is about 30 µm. The sintered porosity of the layer is about 30% with a pore size in the range of 1-2 µm.

Layer 2: The suspension is based on $Zr_{0.78}Sc_{0.2}Y_{0.02}O_{2-\delta}$ powder. The sintered thickness of the foil is about 15 µm. The sintered density of the layer is >96% of the theoretical density.

The second step comprises the lamination of the above mentioned foils into a layered structure comprising two electrolyte layers (9, 10) sandwiched between two electrode precursor layers (11, 12), as shown in FIG. 3. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm².

The fourth step comprises sintering. The laminate is heated at a temperature increase of about 50° C./h to about 500° C. in a flowing air atmosphere. After 2 hours of soaking, the furnace is heated to about 1200° C. with a temperature increase of 100° C./h and left for 5 hours before cooling to room temperature.

The fifth step is the impregnation of a cathode barrier layer. After sintering a nitrate solution of gadolinium doped ceria $(Gd_{0.1}Ce_{0.9})O_{2-\delta}$ (barrier material) is impregnated into the cathode precursor layer two times. After impregnation the sample is heat treated for 1 hour at 400° C.

The sixth step is the impregnation of the cathode. The sintered cell is masked on one side by a rubber seal. A nitrate solution of La, Sr, Co and Fe is infiltrated into the porous structure. The infiltration is performed five times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the seventh step the anode is impregnated. The cathode impregnated side is masked by a rubber seal. A nitrate solution of Cu, Ni, Ce and Gd is infiltrated into the porous structure. The infiltration is performed six times with an intermediate heating schedule between each infiltration for decomposition of the impregnated nitrates. The resulting composition of the impregnated anode part is 4 vol % Cu, 38 vol % Ni and 58 vol % $Zr_{0.78}Sc_{0.2}Y_{0.02}O_{2-\delta}$ (after reduction of NiO).

The obtained cell is about 90 µm thick and ready to be built into a stack of cells. No heat treatment prior to stacking is required.

Example 21

Manufacture of a SOC with a Patterned Profiled Structure

Steps one and two are carried out as described in Example 13.

In the third step, the laminated tapes are cut into pieces. This is done by knife punching resulting in sintered areas in the range up to 40×40 cm$^2$.

In the fourth step the laminated structures are given an egg tray pattern profiled structure by pressing, electrolyte layer (13) and two electrode precursor layers (14,15), as shown in FIG. 4.

The fifth step comprises sintering. The laminate is heated at a temperature increase of about 50° C./h to about 500° C. in a flowing air atmosphere. After 2 hours of soaking, the furnace is heated to about 1200° C. with a temperature increase of 100° C./h and left for 5 hours before cooling to room temperature.

The sixth step is the impregnation of the cathode. The sintered cell is masked on one side by a rubber seal. A nitrate solution of La, Sr, Co and Fe is infiltrated into the porous structure. The infiltration is performed six times with an intermediate heating step for decomposition of the nitrates. The resulting composition of the impregnated perovskite cathode is: $(La_{0.6}Sr_{0.4})_{0.97}(Co_{0.2}Fe_{0.8})O_{3-\delta}$.

In the seventh step the anode is impregnated. The cathode impregnated side is masked by a rubber seal. A nitrate solution of Ni, Ce and Gd is infiltrated into the porous structure. The infiltration is performed seven times with an intermediate heating schedule between each infiltration for decomposition of the impregnated nitrates. The resulting composition of the impregnated anode part is 50 vol % Ni and 50 vol % $Zr_{0.78}Sc_{0.2}Y_{0.02}O_{2-\delta}$ (after reduction of NiO).

The obtained cell is ready to be built into a stack of cells. No heat treatment prior to stacking is required.

Example 22

Manufacture of a SOC

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises pre-calcined YSZ and 10 vol % charcoal as a pore-former. The sintered thickness is about 20 µm. The sintered porosity of the layer is about 50% with a pore size in the range of about 2 µm.

Layer 2: The suspension is based on YSZ powder. The sintered thickness of the foil is about 75 µm. The sintered density of the layer is >96% of the theoretical density.

Step two to four are carried out as described in Example 13.

The fifth step is the impregnation of the cathode. The sintered cell is masked on one side by a rubber seal. A colloidal suspension of $(La_{0.75}Sr_{0.25})Mn_{1.05}O_{3-\delta}$ and $Zr_{0.78}Sc_{0.2}Y_{0.02}O_{2-\delta}$ (2:1 volume ratio) is vacuum infiltrated into the porous structure. The infiltration is performed four times with an intermediate heating step.

In the sixth step the anode is impregnated. The cathode impregnated side is masked by a rubber seal. A colloidal suspension of NiO and $Ce_{0.9}Gd_{0.1}O_2$ is vacuum infiltrated into the porous structure. The infiltration is performed five times with an intermediate drying between each infiltration. The volume ratio of NiO:CGO is 1:2.

The obtained membrane is about 100 µm thick and ready to be built into a stack of cells. No heat treatment prior to stacking is required.

Example 23

Manufacture of a SOC

The first step comprises co-casting of a three-layered structure (layer 1 and 3—electrode precursor layer, and layer 2—electrolyte layer) with intermediate drying after tape-casting of each layer. Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up as described below and the cast is subsequently dried.

Suspension 1, Layers 1 and 3: The suspension comprises pre-calcined $Zr_{0.78}Sc_{0.2}Y_{0.02}O_{2-\delta}$ and 10 vol % charcoal as a pore-former. The sintered thickness is about 40 µm. The sintered porosity of the layer is about 50% with a pore size in the range of about 2 µm.

Suspension 2, Layer 2: The suspension is based on doped zirconia. The sintered thickness of the foil is about 100 µm. The sintered density of the layer is >96% of the theoretical density.

Layer 1 is tape-cast onto a polymeric foil. After drying, Layer 2 is tape-cast directly onto Layer 1, and after a subsequent drying Layer 3 (Suspension 1) is tape-cast directly onto the two layered structure comprising Layer 1 og Layer 2.

In the second step, the co-cast tapes are cut into square pieces. This is done by knife punching resulting in sintered areas in the range of 200-500 cm$^2$.

The third step comprises sintering. The laminate is heated at a temperature increase of about 50° C./h to about 500° C. in a flowing air atmosphere. After 2 hours of soaking, the furnace is heated to about 1150° C. with a temperature increase of 100° C./h and left for 5 hours before cooling to room temperature.

The fifth step is the impregnation of the cathode. The sintered cell is masked on one side by a rubber seal. A colloidal suspension of $(La_{0.75}Sr_{0.25})Mn_{1.05}O_{3-\delta}$ and $Zr_{0.78}Sc_{0.2}Y_{0.02}O_{2-\delta}$ (3:1 volume ratio) is vacuum infiltrated into the porous structure. The infiltration is performed four times with an intermediate heating step.

In the sixth step the anode is impregnated. The cathode impregnated side is masked. A nitrate solution of Ni, Zr and Y is vacuum infiltrated into the porous structure. The infiltration is performed five times with an intermediate heating schedule between each infiltration for decomposition of the impregnated nitrates. The resulting composition of the impregnated anode part is 50 vol % Ni and 50 vol % $Zr_{0.84}Y_{0.16}O_{2-\delta}$ (after reduction of NiO).

The obtained membrane is about 180 µm thick and ready to be built into a stack of cells. No heat treatment prior to stacking is required.

Example 24

Manufacture of a SOC

The first step comprises co-casting of a three-layered structure (layer 1 and 3—electrode precursor layer, and layer 2—electrolyte layer) without intermediate drying. Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up as described below and the cast is subsequently dried.

Suspension 1, Layers 1 and 3: The suspension comprises pre-calcined $Zr_{0.80}Y_{0.20}O_{2-\delta}$ and 10 vol % charcoal as a pore-former. The sintered thickness is about 50 μm. The sintered porosity of the layer is about 50% with a pore size in the range of about 2 μm.

Suspension 2, Layer 2: The suspension is based on $Zr_{0.80}Y_{0.20}O_{2-\delta}$. The sintered thickness of the foil is about 200 μm. The sintered density of the layer is >96% of the theoretical density.

Three doctor blade set-ups are place in series on a polymeric film and the three layers are tape-cast directly onto one another. Layer 1 (Suspension 1)—Layer 2 (Suspension 2) and Layer 3 (Suspension 1).

In the second step, the co-cast tapes are cut into square pieces. This is done by knife punching resulting in sintered areas in the range of 200-500 $cm^2$.

The third step comprises sintering. The laminate is heated at a temperature increase of about 50° C./h to about 500° C. in a flowing air atmosphere. After 2 hours of soaking, the furnace is heated to about 1150° C. with a temperature increase of 100° C./h and left for 5 hours before cooling to room temperature.

The fifth step is the impregnation of the cathode. The sintered cell is masked on one side by a rubber seal. A colloidal suspension of $(La_{0.75}Sr_{0.25})Mn_{1.05}O_{3-\delta}$ and $Zr_{0.80}Y_{0.20}O_{2-\delta}$ (2:1 volume ratio) is vacuum infiltrated into the porous structure. The infiltration is performed four times with an intermediate heating step.

In the sixth step the anode is impregnated. The cathode impregnated side is masked. A colloidal suspension of NiO and $Zr_{0.80}Y_{0.20}O_{2-\delta}$ is vacuum infiltrated into the porous structure. The infiltration is performed four times with an intermediate drying between each infiltration. The resulting composition of the impregnated anode part is 50 vol % Ni and 50 vol % $Zr_{0.80}Y_{0.20}O_{2-\delta}$ (after reduction of NiO).

The obtained membrane is about 300 μm thick and ready to be built into a stack of cells. No heat treatment prior to stacking is required.

The invention claimed is:

1. An all ceramics solid oxide cell, the solid oxide cell comprising a multilayer structure comprising an anode layer comprising catalyst material, a cathode layer comprising catalyst material, and an electrolyte layer sandwiched between the anode layer and the cathode layer, wherein:
   the electrolyte layer comprises doped zirconia and has a thickness of from 40 to 300 μm,
   the anode layer and the cathode layer both comprise doped ceria or both comprise doped zirconia; and
   the multilayer structure comprising the anode layer, the electrolyte layer and the cathode layer is a structure wherein the anode layer and the cathode layer are porous and identical in a doped ceria composition or doped zirconia composition and in a thickness, thereby forming a symmetrical structure, wherein a surface of the anode layer or a surface of the cathode layer, or both, is further impregnated with a barrier material comprising doped ceria.

2. The all ceramics solid oxide cell of claim 1, wherein the thickness of the anode layer and the cathode layer is 150 μm or less.

3. The all ceramics solid oxide cell of claim 1, wherein the electrolyte layer comprises more than one layer.

4. The all ceramics solid oxide cell of claim 1, wherein the anode layer and the cathode layer each comprise more than one layer.

5. The all ceramics solid oxide cell of claim 1, wherein the anode layer and the cathode layer have a porosity of from 20 to 80%.

6. The all ceramics solid oxide cell of claim 1, wherein the anode layer or cathode layer, or both, has been impregnated with the barrier material prior to impregnation with catalyst material.

* * * * *